H. W. BROWN.
ELECTRICAL REGULATOR.
APPLICATION FILED DEC. 19, 1913.

1,234,864.

Patented July 31, 1917.
2 SHEETS—SHEET 1.

WITNESSES:
Fred A. Lind.
J. H. Procter

INVENTOR
Harold W. Brown
BY
Wesley G. Carr
ATTORNEY

H. W. BROWN.
ELECTRICAL REGULATOR.
APPLICATION FILED DEC. 19, 1913.

1,234,864.

Patented July 31, 1917.
2 SHEETS—SHEET 2.

WITNESSES:
Fred A. Lind
J. H. Procter

INVENTOR
Harold W. Brown
BY
Wesley G. Carr
ATTORNEY

UNITED STATES PATENT OFFICE.

HAROLD W. BROWN, OF ITHACA, NEW YORK, ASSIGNOR TO WESTINGHOUSE ELECTRIC AND MANUFACTURING COMPANY, A CORPORATION OF PENNSYLVANIA.

ELECTRICAL REGULATOR.

1,234,864.  Specification of Letters Patent.  Patented July 31, 1917.

Application filed December 19, 1913. Serial No. 807,710.

*To all whom it may concern:*

Be it known that I, HAROLD W. BROWN, a citizen of the United States, and a resident of Ithaca, in the county of Tompkins and State of New York, have invented a new and useful Improvement in Electrical Regulators, of which the following is a specification.

My invention relates to electrical regulators, and it has for its object to provide devices for regulating the voltage of a generator and for regulating the steam flow in a turbine under predetermined conditions of operation.

My invention comprises electromagnetic structures which are excited in proportion to the voltage or power consumed in the circuit to be regulated. Two movable elements interconnected with the electromagnetic structures, one of which is free to move and the other of which is retarded and each of which acts against the pressure of a spring are characteristic of my invention which is similar in principle to that set forth in my United States application, Serial No. 810,797, filed Jan. 7, 1914. The non-retarded element of my invention closes an auxiliary circuit and the retarded element disrupts this circuit a relatively short time afterward. The extreme simplicity of my invention makes it applicable for regulating the voltage of a generator by governing its field excitation or for regulating the steam flow to a turbine in proportion to the current or power in the circuit.

Figure 1:
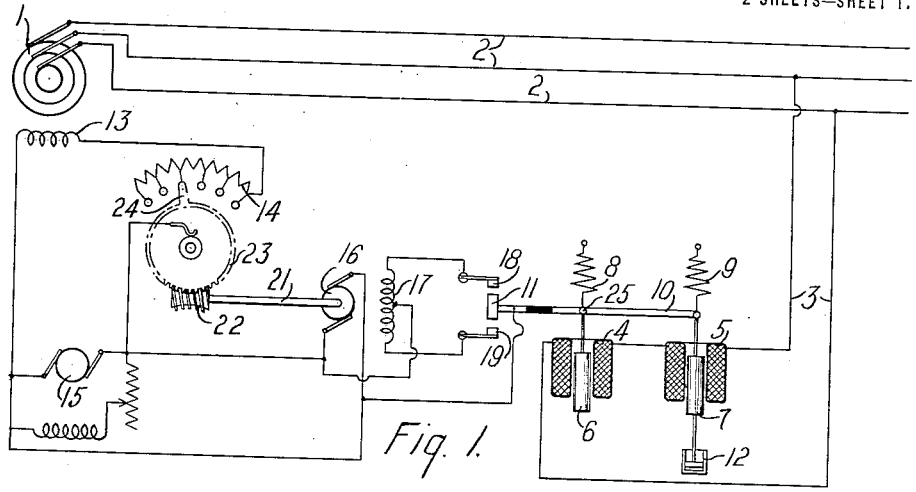
Figure 2:
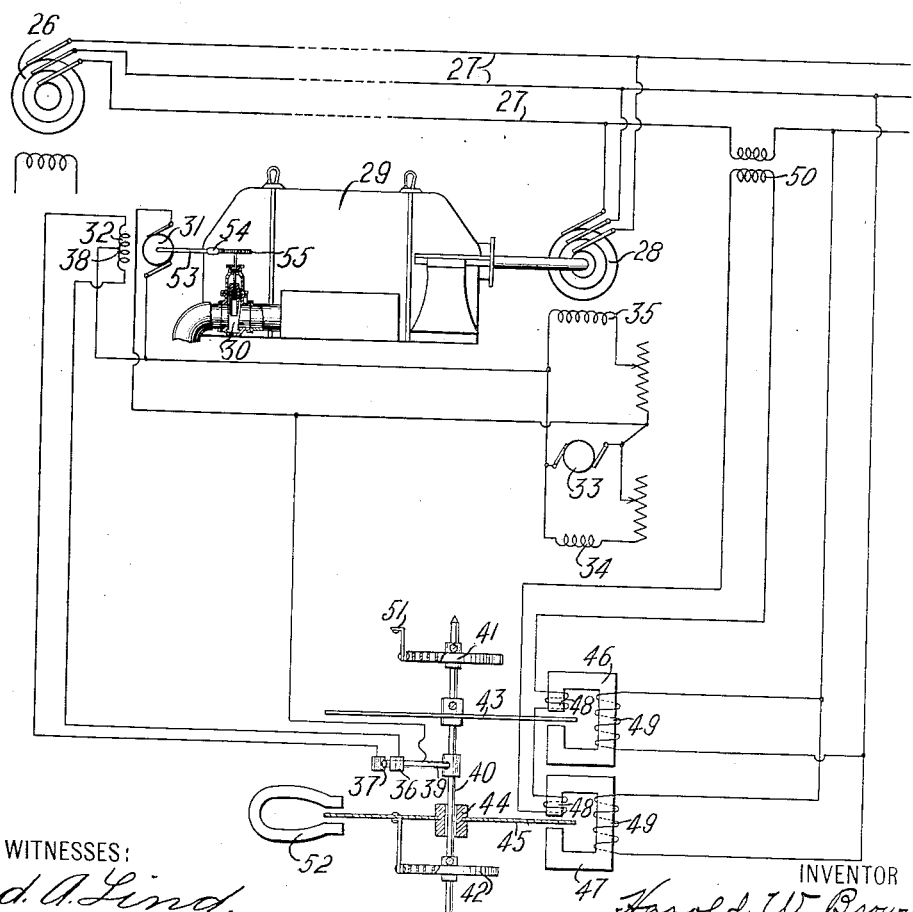
Figure 3:
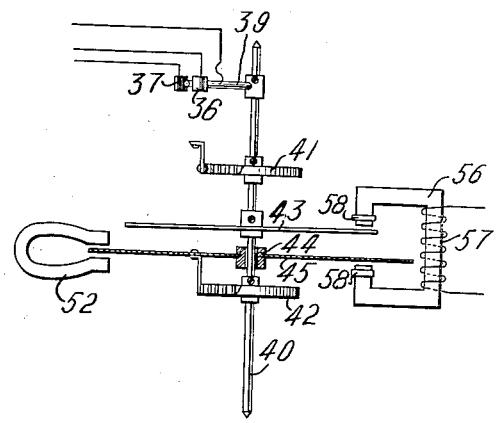
Figure 4:
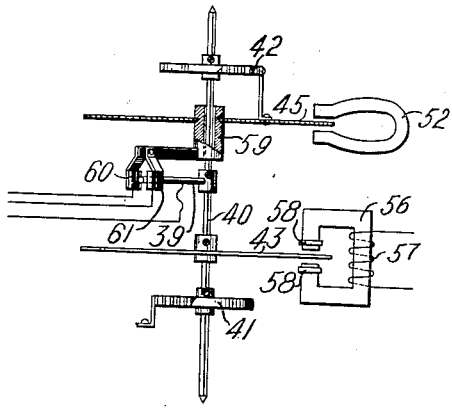

A clear understanding of my invention may be had by referring to the accompanying drawing, of which Figure 1 is a diagrammatic view of a regulator embodying my invention. Fig. 2 is a diagrammatic view of another form of regulator embodying my invention, shown partially in elevation and partially in section, and Figs. 3 and 4 are diagrammatic views of modified forms of regulators embodying my invention, shown partially in elevation and partially in section.

Referring to Fig. 1 of the drawings, my invention is used in conjunction with a generator 1 that supplies a three-phase circuit 2, for maintaining the voltage at a predetermined value, and comprises a second circuit 3 having electromagnets 4 and 5, the coils of which are connected in series, the whole circuit being connected in parallel with one phase of the three-phase circuit 2. The electromagnets 4 and 5 have armatures 6 and 7 to which springs 8 and 9 are respectively connected. The armatures 6 and 7 are pivotally mounted upon a bar 10 carrying a contact block or member 11 at one of its ends. To the armature 7 is connected a dash-pot 12 for retarding its movement. The springs 8 and 9 support the cores of the electromagnets, and are connected to the bar 10 at the points where the armatures 6 and 7 are pivotally mounted. A controlling circuit comprises the field magnet winding 13 of the generator 1 and a resistor 14 in series therewith, the whole being supplied with current from a generator 15 that also supplies a driving motor armature 16 and its field magnet winding 17 with current. One terminal of the field magnet winding 17 is connected to a contact piece 18; its central point is connected to one terminal of the generator 15 and its other terminal is connected to a contact piece 19. The contact block 11 is electrically connected to the other terminal of generator 15, substantially as shown.

When normal voltage is on the circuit 2, the parts are in the positions shown in Fig. 1. If the voltage decreases, the armature 6 immediately moves downwardly to effect engagement between the contact members 11 to 19 and thereby energize the field magnet winding 17 of the motor 16. The motor is thus caused to rotate to drive a shaft 21 upon which is mounted a worm 22 that engages a worm wheel 23 having a contact arm 24 thereon. This operation cuts out the resistance in series with the field magnet winding 13 and thus causes the generator 1 to increase the voltage. After the electromagnet 4 has operated, the electromagnet 5 operates to turn the bar 10 upon a pivotal point 25, thus moving the contact block 11 away from the contact piece 19 and hence stopping the motor. Since the voltage has been increased by cutting out resistance in series with the winding 13, the coils cause the armature 6 to move upwardly, and engagement is effected between the contact pieces 11 and 18. The field magnet winding 17 of the motor 16 is thus excited in the reverse direction, thereby causing resistance to be inserted in the circuit of the field magnet winding 13 to effect a decrease in the generator voltage. The contact block 11 is disengaged from the contact piece 18 by the electromagnet 5, shortly after engagement is effected, movement of its armature having been retarded by the dash-pot 12. Should the voltage continue to vary, the action of making and breaking the circuit will be continued to maintain the voltage substantially constant.

With particular reference to Fig. 2, a generator 26 supplies energy to a three-phase circuit 27, that has its peak load supplied by a generator 28 which is operated by a turbine 29. In order that the turbine 29 and generator 28 shall take the load in excess of a predetermined amount, the steam flow may be controlled by a valve 30 that is operated by a motor 31 having a field magnet winding 32, both of which receive current from a generator 33 having a field magnet winding 34. The generator 33 also supplies a field magnet winding 35 of the generator 28 with current. The terminals of the field magnet winding 32 of the motor 31 are respectively connected to two stationary contact pieces 36 and 37. The middle point 38 of field magnet winding 32 is connected to one terminal of generator 33 and the other terminal of generator 33 is connected to a movable contact piece 39 that is mounted on a shaft 40. The shaft 40 is provided with a rigidly mounted disk 43 and with a loosely fitted sleeve 44 upon which a disk 45 is mounted. The disks 43 and 45 are propelled by field magnet members 46 and 47, each of which is provided with a series or shading coil 48 that receives current from a transformer 50 which is proportional to the current at the receiving end of the three-phase circuit 27, and a shunt or main coil 49 that receives current at a voltage which is proportional to the voltage at the receiving end of said circuit. The outer end of a spiral spring 41 is connected to a stationary piece 51 and its inner end is connected to the shaft 40. The outer end of a second spiral spring 42 is fastened to the disk 45 and its inner end is attached to the shaft 40. A permanent magnet 52 is provided for damping the movement of the disk 45.

The field magnet members 46 and 47 embody a rotating flux that is proportional to the energy delivered to them, and when such energy is a predetermined amount, the springs 41 and 42 balance the torque that tends to rotate the disks 43 and 45 and the field magnet winding 32 of motor 31 remains unexcited. If the load increases, however, the torque will increase and will overcome the torque of the spring 41 and hence cause the contact member 39 to engage contact member 37 and thus cause the motor 31 to operate, and, through shaft 53, worm 54 and worm wheel 55, open a valve 30 to admit steam to the turbine. By the time the turbine operates, disk 45 has operated, through spring 42, to effect disengagement of the contact members 37 and 39 and thus cause the motor 31 to stop. If the load on the receiving end of the circuit decreases to a predetermined value, the spring 41 counterbalances its disk 43 and effects engagement between the contact members 36 and 39 to cause the motor 31 to operate in the opposite direction to decrease the speed of the turbine, thereby reducing the voltage. By the time the speed has decreased, disk 45 has operated, and, through its spring 42, the contact between contact members 36 and 39 is broken. If the voltage or load tends to vary, this cycle of events continues in proportion to the fluctuation of the voltage or load above a predetermined amount on the receiving end of the circuit.

Fig. 3 represents a relay similar to the relay shown in Fig. 2. However, only one field magnet member 56, having a single voltage coil 57 and shading coils 58, is used to operate both disks 43 and 45, the operation being the same as hereinbefore described, in that the springs counterbalance the torque on the disks for normal voltage. When the voltage rises, contact is made to decrease the voltage and then broken, after a time interval, by the retarded element. If the voltage becomes too low, contact is made whereby it is raised. This cycle of operations is continued, as hereinbefore mentioned, if the voltage tends to vary, and maintains the voltage practically constant.

Fig. 4 illustrates a modification of my invention and comprises a shaft 40 that is provided with springs 41 and 42, a contact member 39 and a disk 43. Disk 43 is rotated by the torque exerted by the field member 56. A sleeve 59 loosely surrounds the shaft 40 and carries disk 45 and two contact members 60 and 61. The disk 45 is retarded by the damping magnet 52. The operation is similar to the operation of the structures hereinbefore described in that, when the voltage so rises that the field magnet member 56 exerts sufficient torque to overcome spring 41, contact member 39 is moved into engagement with contact member 61, disengagement being finally effected by the action of spring 41 turning the sleeve 59 and its disk 45 against the action of damping magnet 52.

My invention can be adapted to the regulation of either direct or alternating current circuits by one versed in the art and, hence, I do not limit my invention to regulating any particular form or arrangement of apparatus except as specified in the appended claims.

I claim:

1. An electrical regulator comprising coöperating contact members, a shaft for actuating one of said members, means for yieldingly opposing movements of the shaft, a conducting armature fixed to the shaft, another conducting armature loosely mounted upon the shaft, resilient means interposed between the latter armature and the shaft, means for retarding movements of the latter armature, and actuating means for at least one of said armatures.

2. An electrical regulator comprising coöperating contact members, a shaft for actuating one of said members, means for yieldingly opposing movements of the shaft, a conducting armature fixed to the shaft, another conducting armature loosely mounted upon the shaft, resilient means interposed between the latter armature and the shaft, means for retarding movements of the latter armature, and means for similarly actuating the said armatures.

3. An electrical regulator comprising coöperating contact members, a shaft for actuating one of said members, means for yieldingly opposing movements of the shaft, a conducting armature fixed to the shaft, another conducting armature loosely mounted upon the shaft, resilient means interposed between the latter armature and the shaft, means for retarding movements of the latter armature, and separate actuating means for the armatures.

4. An electrical regulator comprising coöperating contact members, a shaft for actuating one of said members, means for yieldingly opposing movements of the shaft, a conducting armature fixed to the shaft, another conducting armature loosely mounted upon the shaft, resilient means interposed between the latter armature and the shaft, means for retarding movements of the latter armature, and means for exerting supplementary torques upon the armatures.

In testimony whereof, I have hereunto subscribed my name this 28th day of November, 1913.

HAROLD W. BROWN.

Witnesses:
   FRED L. CLOCK,
   D. V. PROCTOR.